US008538109B2

(12) United States Patent
Vitanovski et al.

(10) Patent No.: US 8,538,109 B2
(45) Date of Patent: Sep. 17, 2013

(54) METHOD AND SYSTEM FOR DYNAMIC PULMONARY TRUNK MODELING AND INTERVENTION PLANNING

(75) Inventors: Dime Vitanovski, Erlangen (DE); Razvan Ioan Ionasec, Lawrenceville, NJ (US); Bogdan Georgescu, Plainsboro, NJ (US); Martin Huber, Uttenreuth (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 852 days.

(21) Appl. No.: 12/724,612

(22) Filed: Mar. 16, 2010

(65) Prior Publication Data

US 2010/0239147 A1 Sep. 23, 2010

Related U.S. Application Data

(60) Provisional application No. 61/161,172, filed on Mar. 18, 2009.

(51) Int. Cl.
*G06T 7/00* (2006.01)
(52) U.S. Cl.
USPC .......................................... 382/131; 382/128
(58) Field of Classification Search
None
See application file for complete search history.

(56) References Cited

U.S. PATENT DOCUMENTS

| 6,598,307 | B2 | 7/2003 | Love et al. |
| 2005/0281447 | A1 | 12/2005 | Moreau-Gobard et al. |
| 2008/0085043 | A1 | 4/2008 | Watanabe et al. |
| 2008/0317331 | A1* | 12/2008 | Winn et al. ............... 382/154 |
| 2009/0154785 | A1 | 6/2009 | Lynch et al. |

OTHER PUBLICATIONS

Schievano et al., Variations in Right Ventricular Outflow Tract Morphology Following Repair of Congenital Heart Disease: Implications for Percutaneous Pulmonary Valve Implantation, 2007, Journal of Cardiovascular Magnetic Resonance (2007) 9, 687-695.*
Peters et al., Discriminative Boundary Detection for Model-Based Heart Segmentation in CT Images, Medical Imaging 2007: Image Processing, Proc. of SPIE vol. 6512, 65120H, (2007).*
Shievano, S. et al., "Variations in Right Ventricular Outflow Tract Morphology Following Repair of Congenital Heart Disease: Implications for Percutaneous Pulmonary Value Implantation", Journal of Cardiovascular Magnetic Resonance 9(4) (2007), pp. 687-695.
Yang, L. et al., "3D Ultrasound Tracking of the Left Ventricle Using One-Step Forward Predication and Data Fusion of Collaborative Trackiers", In CVPR, (2008).

* cited by examiner

*Primary Examiner* — John Pauls
*Assistant Examiner* — Jason Tiedeman

(57) ABSTRACT

A method and system for modeling the pulmonary trunk in 4D image data, such as 4D CT data, and model-based percutaneous pulmonary valve implantation (PPVI) intervention is disclosed. A patient-specific dynamic pulmonary trunk data is generated from 4D image data of a patient. The patient is automatically classified as suitable for PPVI intervention or not suitable for PPVI intervention based on the generated patient-specific dynamic pulmonary trunk model.

25 Claims, 10 Drawing Sheets

METHOD AND SYSTEM FOR DYNAMIC PULMONARY TRUNK MODELING AND INTERVENTION PLANNING

This application claims the benefit of U.S. Provisional Application No. 61/161,172, filed Mar. 18, 2009, the disclosure of which is herein incorporated by reference.

BACKGROUND OF THE INVENTION

The present invention relates to dynamic modeling of the pulmonary trunk using medical images, and more particularly, to pulmonary trunk modeling and percutaneous pulmonary valve implantation (PPVI) intervention planning using 4D computed tomography (CT) image data.

Valvular heart disease (VHD) is a cardiac disorder that affects a large number of patients and often requires elaborate diagnostic procedures, intervention, and long-term management. In most cases, pulmonary abnormalities occur in conjunction with other heart diseases, and can be caused by congenital defects, pulmonary hypertension, endocarditis, rheumatic fever, and carcinoid heart disease. Such conditions require constant monitoring and a complex clinical workflow, including patient evaluation, percutaneous intervention planning, valve replacement and repair, and follow-up evaluations.

Traditionally, pulmonary valve replacement has been performed surgically on an open heart, with associated risks including, high mortality, incidence of neurological damage, stroke, and repeated valve replacement. However, minimally invasive procedures for the pulmonary valve are less traumatic and reduce the risks associated with valve replacement. Percutaneous pulmonary valve implantation (PPVI) is a recently developed technique for transcatheter placement of a valve stent. Some difficulties with PPVI include the 3D/4D assessment of the pulmonary trunk morphology and in particular the right ventricle outflow track (RVOT) which must be less than 22 mm before treatment, the classification of patients suitable for the procedure, and the identification of the exact location for anchoring the stent. Hence, precise assessment of the morphology and dynamics of the pulmonary valve is crucial for the pre-procedural planning and successful intervention of PPVI.

Cardiac computed tomography (CT) imaging is often performed when high spatial resolution, soft tissue contrast, or dynamics is essential. The key advantage of cardiac CT imaging is the ability to acquire multiple non-invasive and accurate scans required for evaluation. In standard clinical settings, cardiac CT imaging is used to gain information about the shape of the RVOT and the pulmonary artery. In such cases, the acquired 4D CT data is usually translated into sets of 2D planes for manual quantification and visual evaluation, due to lack of appropriate methods and tools for processing the 3D/4D image data. Measurements may be tedious to obtain and are often affected by inaccuracies, as 2D alignment and sectioning is ambiguous and can lead to misinterpretation of the image data.

BRIEF SUMMARY OF THE INVENTION

The present invention provides a method and system for modeling the pulmonary trunk using 4D computed tomography (CT) or magnetic resonance imaging (MRI) data in order to quantitatively evaluate the function of the pulmonary trunk and to determine whether a patient is suitable for percutaneous pulmonary valve implantation (PPVI). The present inventors have developed a dynamic physiological model of the pulmonary trunk, whose parameters can be automatically estimated for an individual patient from 4D image data of the heart. The dynamic physiological model can be used to determine model-based measurements of the pulmonary trunk's geometry and dynamics, and can also be used to automatically determine whether a patient is suitable for PPVI.

In one embodiment of the present invention, 4D cardiac image data of a patient is received. A patient-specific dynamic pulmonary trunk model is then generated based on the 4D cardiac image data of the patient. The patient is classified as suitable or unsuitable for PPVI intervention based on the generated patient-specific dynamic pulmonary trunk model. In order to classify the patient based on the patient-specific pulmonary trunk model, shape features can be extracted from the patient specific dynamic pulmonary trunk model and the patient can be classified as suitable or unsuitable for PPVI intervention based on the extracted shape features using a trained discriminative distance function.

These and other advantages of the invention will be apparent to those of ordinary skill in the art by reference to the following detailed description and the accompanying drawings.

DETAILED DESCRIPTION

The present invention relates to modeling and quantitative evaluation of the pulmonary trunk and percutaneous pulmonary valve implantation (PPVI) intervention planning using 4D computed tomography (CT) image data. Embodiments of the present invention are described herein to give a visual understanding of the pulmonary trunk modeling method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system. Embodiments of the present invention are described herein as using 4D CT data to model and quantitatively evaluate the pulmonary valve. It is to be understood that the present invention is not limited to CT, but can be applied to other medical imaging techniques, such as magnetic resonance imaging (MRI), echocardiography, that collect volumetric image data of the heart over a time period.

Figure 1:
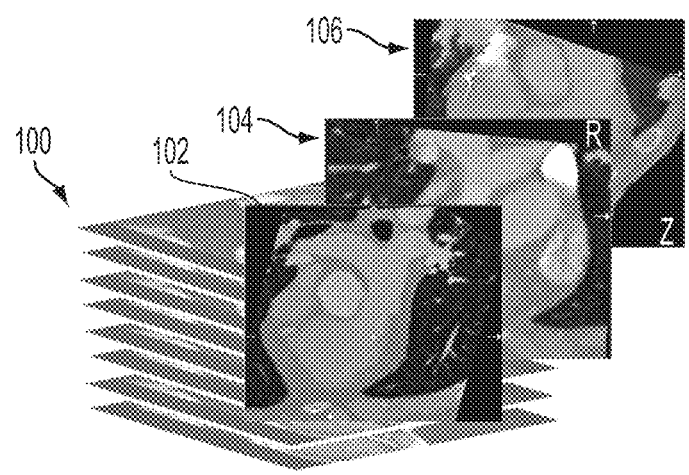
FIG. 1 illustrates exemplary cardiac 4D CT data.

The present inventors have developed a dynamic modeling framework for the pulmonary trunk, which can be estimated from cardiac CT data. A generic 4D dynamic model of the pulmonary trunk is computed off line from a comprehensive training set. Patient specific segmentation of the pulmonary trunk is performed by fitting the generic 4D model of the pulmonary trunk to patient specific image data. The pulmonary trunk model can be estimated for a patient from patient specific CT or MRI data, or both. FIG. 1 illustrates exemplary cardiac 4D CT data. CT acquisition protocols enable full 3D data capturing over the whole cardiac cycle. As illustrated in FIG. 1, the 4D CT data 100 is a dynamic CT volume sequence taken over a period of time, in which each frame 102, 104, and 106 is a 3D CT volume.

Figure 2:
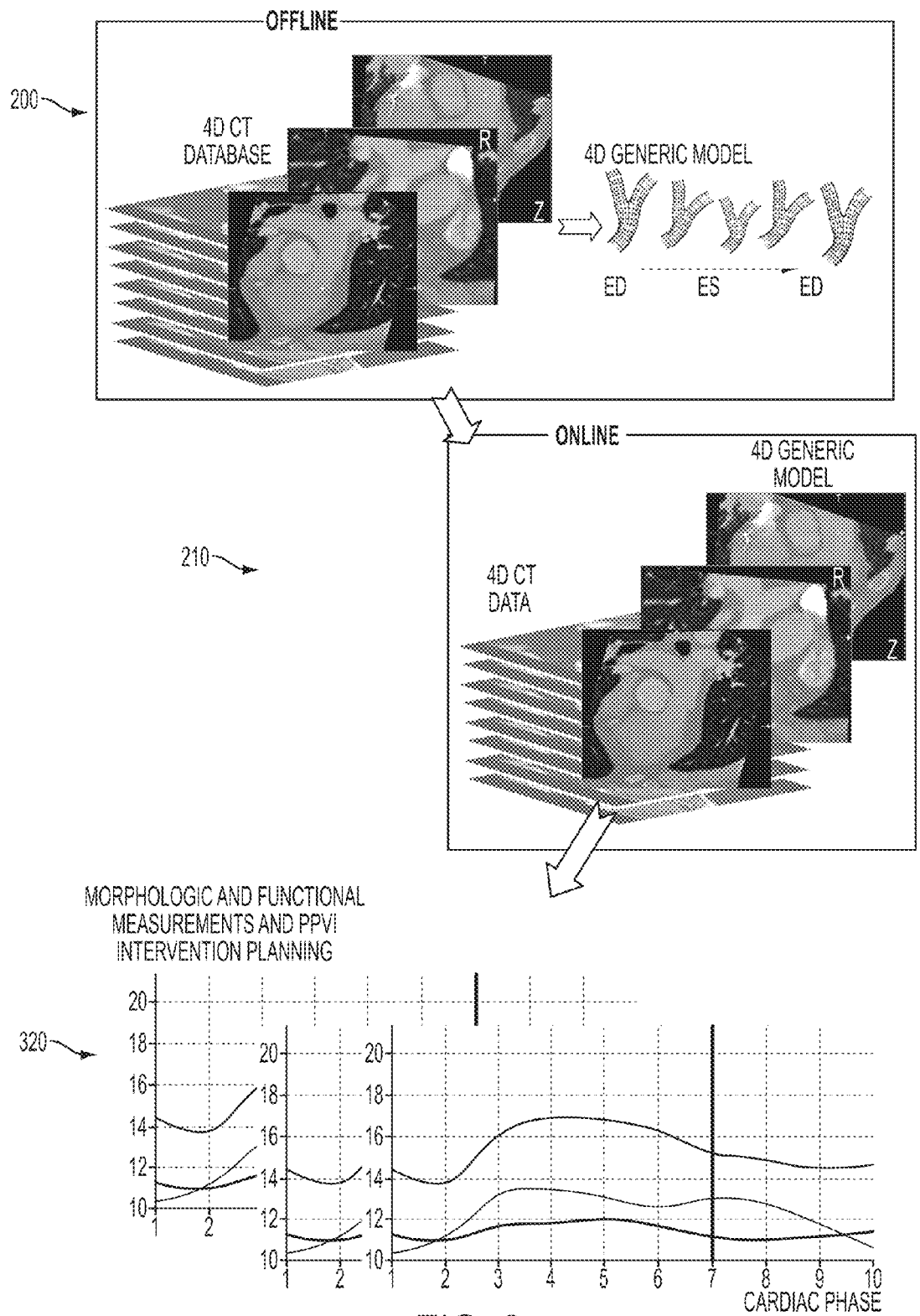
FIG. 2 illustrates a framework for dynamic pulmonary trunk modeling according to an embodiment of the present invention.

FIG. 2 illustrates a framework for dynamic pulmonary trunk modeling according to an embodiment of the present invention. As illustrated in FIG. 2, the framework for a dynamic pulmonary trunk modeling and quantitative evaluation method according to an embodiment of the present invention involves three stages. In the first stage 200, a 4D generic model of the pulmonary artery (trunk) is learned from a comprehensive database of examples. For example, the 4D generic model can be learned from annotated volumes in a database of 4D CT data. The generic model learning stage 200 is performed offline prior to processing patient specific data. In the second stage 210, the 4D generic model of the pulmonary trunk is fitted to patient specific volumetric scans using robust machine-learning methods in order to obtain a patient specific physiological model. The patient specific 4D pulmonary trunk model can be segmented from patient specific 4D CT data, but the present invention is not limited thereto. For example, patient specific 4D MRI data, which includes 3D isometric MRI data and multi-projection time sequence (2D+t) MRI data, can also be used to segment a patient specific 4D pulmonary trunk model. In the third stage 220, morphological and functional measurements of the pulmonary artery are quantified from the patient specific dynamic 4D pulmonary trunk model, and PPVI intervention planning is performed. Each of the stages 200, 210, and 220 is described in greater detail below.

The first stage 200, which is performed offline and is modality independent, generates a generic dynamic model of the pulmonary trunk from a comprehensive database of CT sequences manually annotated by expert radiologists. Procrustes analysis and principle component analysis (PCA) are used to align the data set and learn the shape and deformation modes of the pulmonary artery in order to make a generic 4D model of the pulmonary trunk. In order to accurately represent morphology and dynamics, the model design is consistent with the anatomy and physiology of the pulmonary trunk. The model is atomically oriented and includes clinically relevant anatomic structures. Geometries are represented parametrically using non-uniform rational B-splines (NURBS), and dynamics are implicitly defined within the same mathematical formulations. The model is formulated in three abstraction layers, anatomical landmarks, ribs, and surface topology.

Figure 3A:
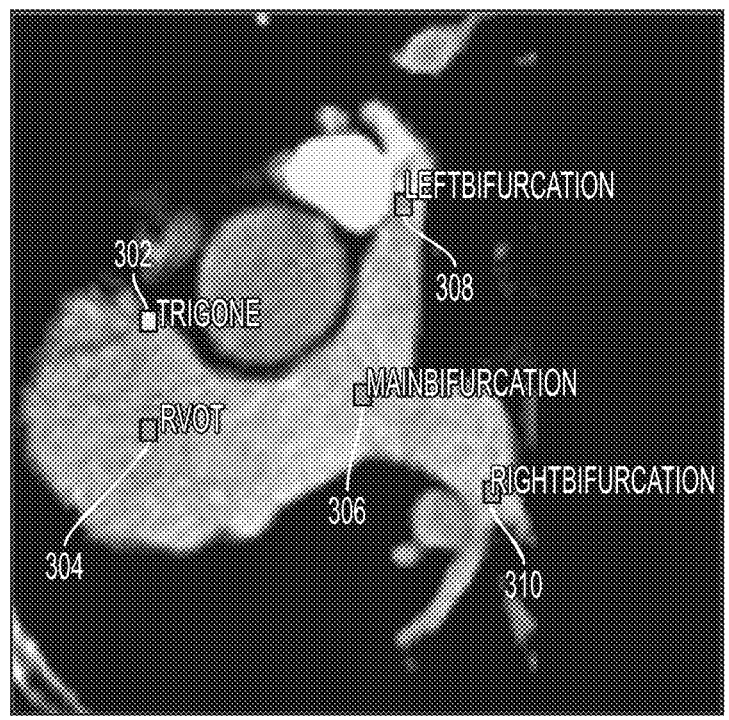
FIG. 3A illustrates anatomic landmarks in an exemplary CT image.

The first abstraction layer of the pulmonary trunk model is given by five anatomical landmarks. The five anatomic landmarks are the trigone ($L_t$), right ventricular outflow tract (RVOT) ($L_{rvot}$), main-bifurcation ($L_{mb}$), left-bifurcation ($L_{lb}$), and right-bifurcation ($L_{rb}$). The trigone defines the splitting point between the right ventricle outflow track and the tricuspid valve plane. The RVOT landmark is located on the same plane as the trigone, parallel to the tricuspid valve plane. The main-bifurcation defines the center of the branching of the pulmonary trunk, while the left-bifurcation and the right-bifurcation mark ends of the left and right branches, respectively, of the pulmonary trunk as contained in the image data. FIG. 3A illustrates the anatomic landmarks in an exemplary CT image. As illustrated in image 3A, the trigone 302, RVOT 304, main-bifurcation 306, left-bifurcation 308, and right-bifurcation 310 landmarks are shown in the CT image.

Figure 3B:
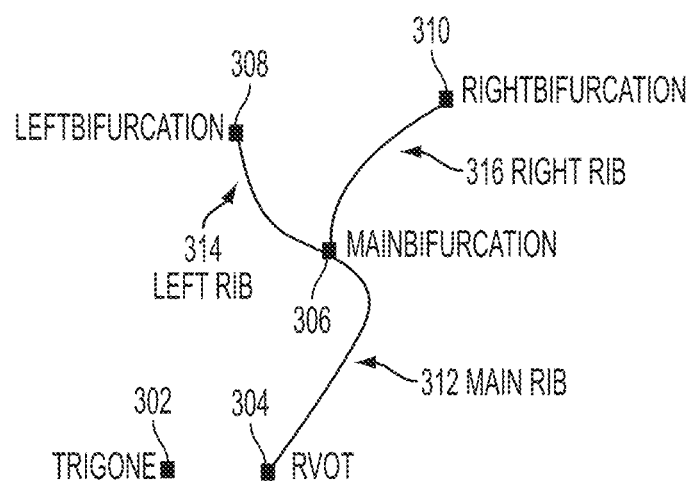
FIG. 3B illustrates ribs of the pulmonary trunk constrained by the anatomic landmarks.

The ribs of the pulmonary artery are constrained by the five anatomic landmarks and form the second abstraction layer of the pulmonary trunk model. As used herein, the term "rib" refers to the centerline of an artery branch. The main-rib is the centerline of the main branch of the pulmonary trunk, the left-rib is the centerline of the left branch of the pulmonary trunk, and the right-rib is the centerline of the right pulmonary branch. FIG. 3B illustrates ribs of the pulmonary trunk constrained by the anatomic landmarks. As illustrated in FIG. 3B, the main-rib 312 is bounded by the RVOT 304 and main-bifurcation 306. The left-rib 314 extends from the left-bifurcation 308 to the main-bifurcation 306, and the right-rib 316 extends from the right-bifurcation 310 to the main-bifurcation 306.

Figure 3C:
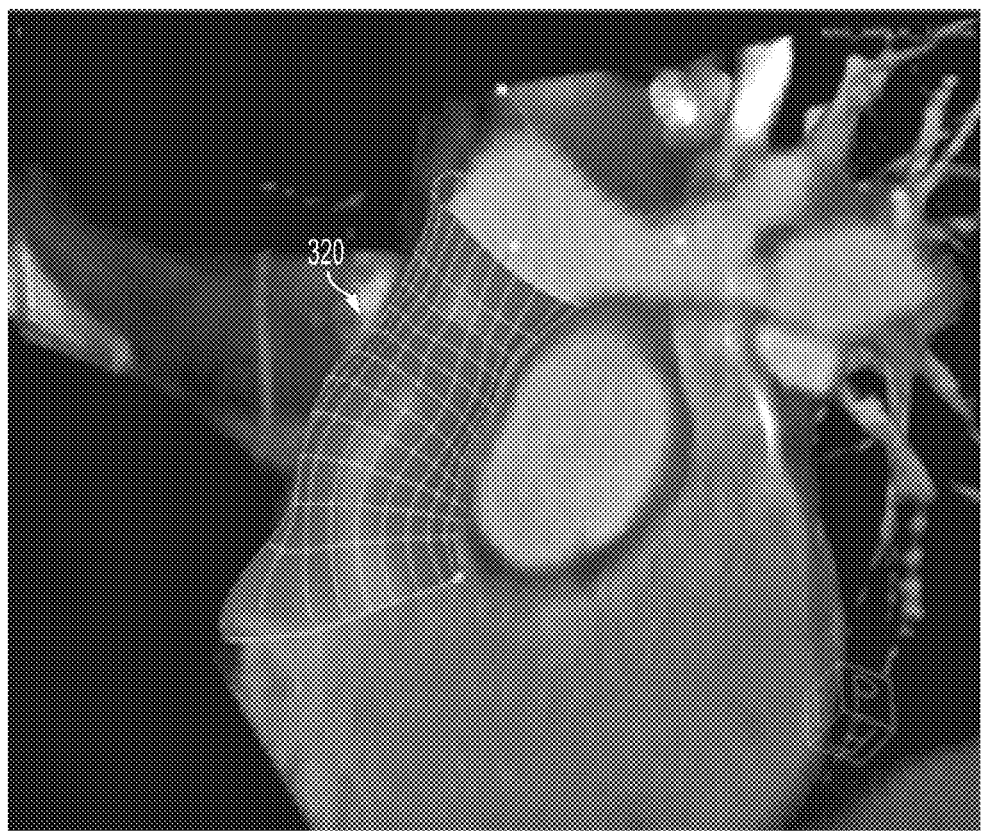
FIG. 3C illustrates a physiological surface model 320 of the pulmonary trunk.

The third abstraction layer of the model is the surface topology of the pulmonary trunk. The main pulmonary artery along with its bifurcations is modeled as a parametric closed surface similar to a deformed cylinder. NURBS can be used as the parametric representation of the surface. The topology and morphology of the arterial structure is characterized and constrained by the previously defined anatomic landmarks and ribs. In order to obtain the physiological model of the pulmonary trunk, the three cylindrical structures with the main-rib, left-rib, and right-rib as the respective center-lines are generated and merged at the bifurcation region (i.e., the main-bifurcation). This physiological model is a generic model that can be used to segment the pulmonary trunk on an individual basis for patient specific CT data. FIG. 3C illustrates a physiological surface model 320 of the pulmonary trunk.

Figure 4:
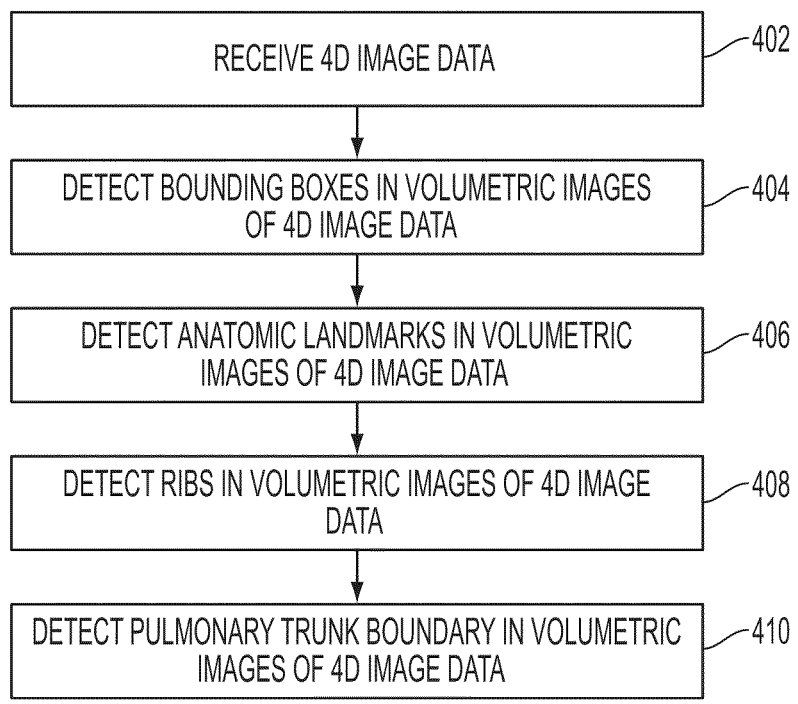
FIG. 4 illustrates a method for modeling the pulmonary trunk based on 4D image data according to an embodiment of the present invention.

The second stage (210 of FIG. 2) is performed online and estimates a patient specific model of the pulmonary artery by fitting the offline model to the available patient specific volumetric CT images. FIG. 4 illustrates a method for modeling the pulmonary trunk based on 4D image data according to an embodiment of the present invention. The method of FIG. 4 transforms 4D image data to generate a model of a patient's pulmonary trunk. Referring to FIG. 4, at step 402, 4D cardiac image data is received. The image data can be 4D cardiac CT data, but the present invention is not limited thereto. For example, MRI data can also be used to generate a patient specific pulmonary trunk model. The 4D CT data can be a dynamic sequence of 3D cardiac CT volumes taken over a period of time. Each 3D CT volume in the sequence can be referred to as a frame. The sequence of CT volumes can be taken over at least one full cardiac cycle. It is possible that the image data can be received directly from an image acquisition device, such as a CT scanning device, in real time as the image data is acquired by the image acquisition device. It is also possible that the image data can be received by loading image data stored in a memory or storage of a computer system, or some other computer readable medium.

At step 404, bounding boxes are detected in the volumetric images (frames) of the 4D image data. In particular, for each landmark except the trigone, which is included in the RVOT bounding box ($\theta_{rvot}$), a corresponding bounding box is defined. Each bounding box is parameterized by an affine transformation $\theta=(X,Y,Z,\alpha,\beta,\chi,S_x,S_y,S_z)$, which represents three position parameters, three orientation parameters, and three scale parameters. Bounding boxes are detected for the RVOT $\theta_{rvot}$, the main bifurcation $\theta_{mb}$, the left bifurcation $\theta_{lb}$, and the right bifurcation $\theta_{rb}$. The RVOT bounding box $\theta_{rvot}$ is defined with an orientation given by the centerline's tangent. The main bifurcation bounding box $\theta_{mb}$ is defined with an orientation orthogonal to the trunk.

Each of the bounding boxes is detected in the volumetric images using a corresponding trained bounding box detector. The bounding box detectors are trained based on annotated training data using a probabilistic boosting tree (PBT) with 3D Haar and steerable features. A separate bounding box detector is trained to detect each bounding box ($\theta_{rvot}$, $\theta_{mb}$, $\theta_{lb}$, and $\theta_{rb}$). In order to efficiently perform learning in a high dimensional space, Marginal Space Learning (MSL) is used to marginalize the search space into subspaces which are gradually increased. Consequently, the parameter estimation problem is split into three stages where classifiers, parameterized by the current subset of affine values, are sequentially trained on the subspaces: position, position-orientation, and full affine transformation (i.e., position-orientation-scale). A further speed improvement can be achieved by using a pyramid-based coarse-to-fine approach and searching in a low resolution (e.g., 3 mm) volume.

Detection of the bounding boxes is first performed in one or more reference frames of the 4D image data. For example, the bounding boxes can be first detected in frames representing the End-Diastolic (ED) and End-Systolic (ES) phases of the cardiac cycle, then extended to the remaining frames in a prone search space. Independent bounding box detectors are trained for detecting the bounding boxes in each modality (e.g., CT and MRI).

At step 406, anatomic landmarks are detected in the volumetric images of the 4D image data. In particular, the estimated parameters $\theta_i$ of the detected bounding boxes initialize the landmarks ($L_t$, $L_{rvot}$, $L_{mb}$, $L_{lb}$, $L_{rb}$) by their positions and orientations and constrain the search domain D, for each landmark by their scales. It is to be understood that the trigone $L_t$ is initialized based on the RVOT bounding box $\theta_{rvot}$. The accuracy of the landmark locations initialized by the bounding boxes can be improved by learning, for each landmark, a discriminative 2 level PBT classifier $H_L$ which learns the target distribution:

$$p(L_i|x_l,y_l,z_l,I)=H_i(x_l,y_l,z_l|I),(x_l,y_l,z_l)\epsilon D_i, \; i=1\ldots 5 \quad (1)$$

in 1 mm volume resolution, where $p(L_i|x_l,y_l,z_l,I)$ is the probability of the presence of $L_i$ at location $(x_l,y_l,z_l)$. For each landmark, such a trained classifier is used to search the constrained search space to accurately detect that landmark. The anatomic landmarks are initially detected in one or more reference frames, such as the ED frame and the ES frame, and extended to the remaining frames.

At step 408, the ribs of the pulmonary artery are detected. The main-rib, left-rib, and right-rib are initialized based on the landmark positions detected in step 406. In particular, the main-rib is initialized based on the positions of the RVOT $L_{rvot}$ and the main-bifurcation $L_{mb}$ the left-rib is initialized based on the positions of the main-bifurcation $L_{mb}$ and the left-bifurcation $L_{lb}$ and the right-rib is initialized based on the positions of the main-bifurcation $L_{mb}$ and right-bifurcation $L_{rb}$. After the three ribs are initialized, using trained circle detectors, the shape/trajectory of the ribs are updated to follow center-line of the corresponding portions of the pulmonary artery. The circle detectors (one for each rib) can be trained based on annotated training data using PBT with Haar features. The circle detectors are sequentially applied to each frame of the sequence (4D image data), starting with the reference frames (ED and ES frames).

In the learning phase, for training the circle detectors, positive and negative training samples are generated in circular form, following annotated curves in the training data. In the detection stage, an incremental approach is used for searching 3D center points $Q_i$ on a series of parallel planes. These are bounded by the corresponding landmarks, while their normal is given by the initial center-line and updated after each detected center point. A least-squares approach can be used to fit a parametric NURBS curve to the discrete set of detected center points $Q_i$. The least squares estimation (LSE) problem is solved by minimizing the following objective function with respect to the control points $P^k$:

$$E = \sum_{i=1}^{N-1} |Q_i - C(\bar{u}_i)|^2, \; \underset{u \in [0,1]}{C(u)} = \frac{\sum_{k=0}^{n} N_{k,d}(u)w_k P^k}{\sum_{k=0}^{n} N_{k,d}(u)w_k}. \quad (2)$$

At step 410, the pulmonary trunk boundary is detected in the volumetric images of the 4D image data. The full surface model of the pulmonary trunk is initialized by projecting a mean shape, averaged over a set of annotated training data, into the patient specific anatomy. This projection is achieved using a piecewise affine transformation defined from the detected landmarks and center-lines (ribs).

Figure 5:
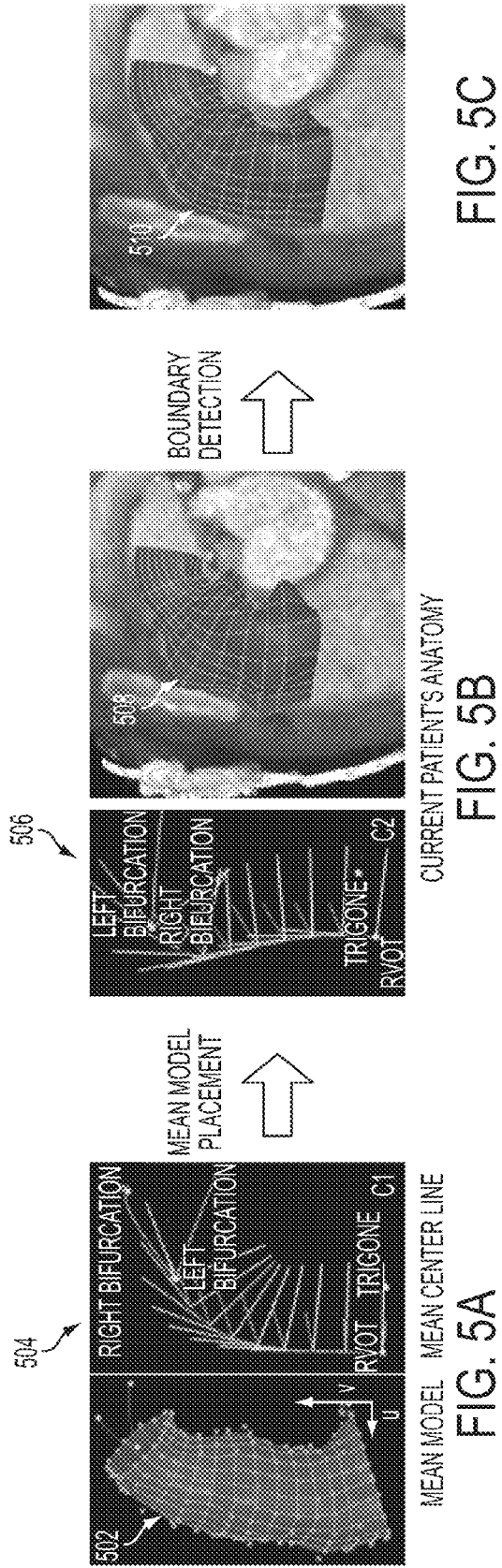
FIG. 5 illustrates detection of the patient specific pulmonary trunk model.

A set of center-points $C_i$ are equidistantly sampled along the detected ribs. At the location of each center-point a local coordinate system is constructed using the detected rib's tangent and a projected RVOT-Trigone line to define the orientation. The control points $P^k$ are associated with one of the local coordinate systems based on their Euclidean distance to the local origin. Using a coordinate system transformation, the mean-shape control points $P^k$ are mapped to the corresponding image location in the patient specific images. FIG. 5 illustrates detection of the patient specific pulmonary trunk model. As illustrated in FIG. 5, image (a) shows a mean model 502 and mean centerline for the pulmonary trunk model. Image (b) shows the detected centerlines 506 in patient specific image data, and a transformed mean pulmonary trunk model 508 projected to the patient specific image data.

The transformed mean pulmonary trunk model provides accurate global fitting into the patient's specific anatomy. However, further local processing is used to precisely delineate the pulmonary trunk boundary. For precise boundary delineation, a trained boundary detector is used to move the parametrical shape points along the normal direction to an optimal position where a score from the boundary detector is highest. The boundary detector can be trained based on annotated training data using PBT with steerable features. A spatially smooth surface can then be obtained by projecting the detected surface into a corresponding shape subspace. Referring to FIG. 5, image (c) shows a patient-specific pulmonary trunk model 510 resulting from boundary delineation using the trained boundary detector to process the transformed mean model 508.

Temporal consistency of the dynamic pulmonary trunk model is enhanced using a one-step-forward approach. Such a one-step forward approach is described in Yang, L. et al., "3d Ultrasound Tracking of the Left Ventricle Using One-Step Forward Prediction and Data Fusion of Collaborative Trackers", CVPR 2008, which is incorporated herein by reference. The one-step-forward approach is applied to estimate a motion prior using manifold learning, which gives an appropriate initialization for the boundary detectors. Optical flow is fused with tracking by detection to achieve temporal consistency. In particular, the pulmonary trunk model can be detected in a reference frame (ED or ES), the motion can be tracked using the motion prior to each subsequent frame, and the boundary detector used in each subsequent frame to generate the final detection result for each frame in a cardiac cycle.

Figure 6:
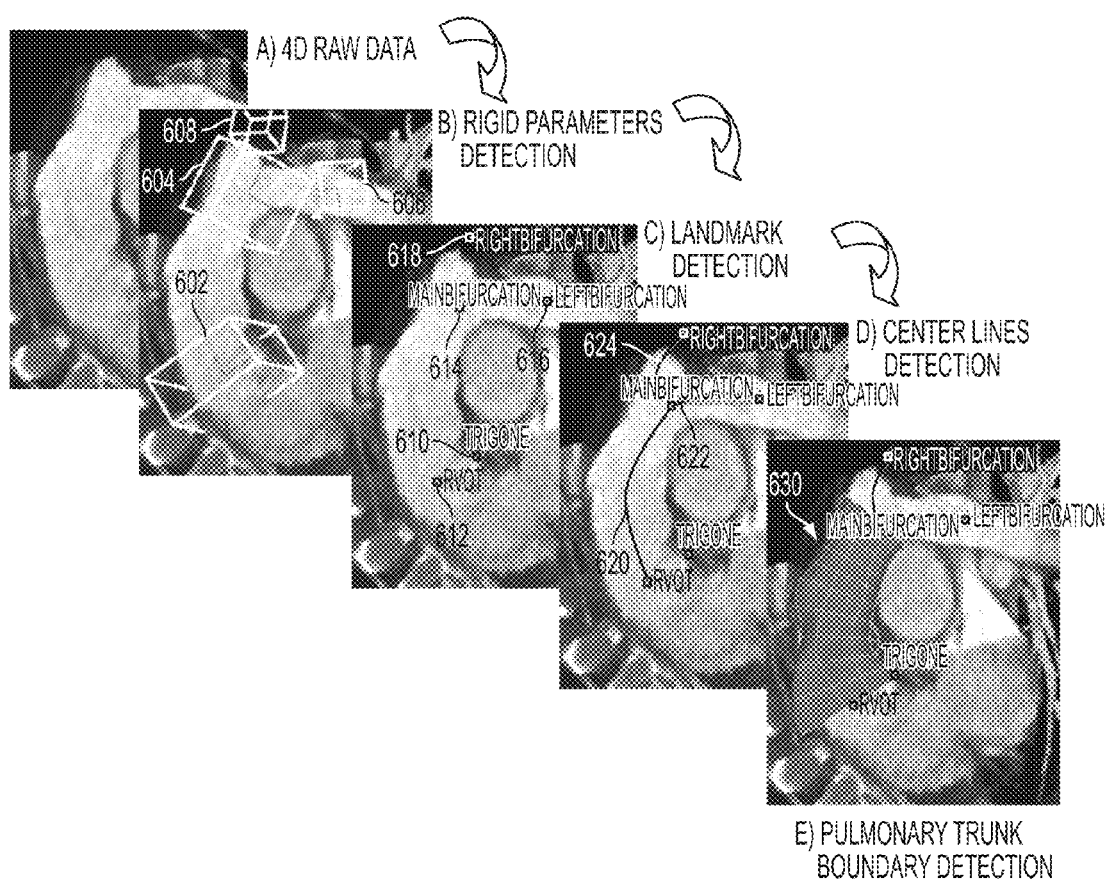
FIG. 6 illustrates exemplary results of the method steps of FIG. 4.

FIG. 6 illustrates exemplary results of the method steps of FIG. 4. As illustrated in FIG. 6, image (a) shows exemplary raw image data received at step 402. Image (b) shows rigid parameters (i.e., bounding boxes) detection performed at step 404. As shown in image (b), an RVOT bounding 602, a main bifurcation bounding box 604, a left bifurcation bounding box 606, and a right bifurcation bounding box 608 are detected. Image (c) shows landmark detection performed at step 406. A shown in image (c), the trigone 610, RVOT 612, main bifurcation 614, left bifurcation 616, and right bifurcation 618 are detected. Image (d) shows center line (rib) detection performed at step 408. As shown in image (d), a main rib 620, left rib 622, and right rib 624 are detected. Image (e) shows a final pulmonary trunk boundary detection result 630 resulting from step 410.

The method of FIG. 4 results in a 4D segmentation of the pulmonary trunk over the sequence of the 4D image data. For example, the 4D segmentation of the pulmonary trunk can show the dynamics of the 3D geometry of the pulmonary trunk over a full cardiac cycle.

Once the patient specific 4D pulmonary trunk model is segmented from patient specific image data, the patient specific 4D pulmonary trunk model can be used for efficient quantification and measurement of the pulmonary artery's morphology and function as well as model-based PPVI intervention planning (220 of FIG. 3). As opposed to the current practice, which computes two-dimensional measurements using manual methods, the 4D pulmonary artery segmentation obtained using the method of FIG. 4 facilitates online computation of 4D geometric and dynamic measurements of the pulmonary trunk over the course of the cardiac cycle. For example, possible measurements that can be automatically calculated using the 4D pulmonary trunk model can be used to measure pulmonary hypertension, the McGoon Ratio, the pulmonary artery index, and the Nakata index, as well as for PPVI intervention planning. It is to be understood that these measurements are exemplary and other 4D geometric and dynamic measurements can also be calculated using the patient specific 4D pulmonary trunk model.

PPVI is a minimally invasive approach for replacing the pulmonary valve without the need for open heart surgery. However successful use of PPVI intervention depends on the following issues: the 3D/4D assessment of the pulmonary trunk morphology; the right ventricle outflow track (RVOT) must be less than 22 mm before treatment; the classification of patients suitable for the procedure; and the identification of the exact location for anchoring a stent. The dynamic pulmonary trunk model resulting from the method of FIG. 4 provides accurate 3D/4D assessment of the pulmonary trunk morphology. The patient specific model also can automatically provide an accurate measurement for the diameter of the RVOT, and can be used to determine an exact location for anchoring the stent. Furthermore, an automatic model based method can be performed to determine whether a patient is suitable for PPVI intervention.

The morphology of the pulmonary trunk is a major determinant of suitability for PPVI. Intervention in unsuitable patients exposes patients to unnecessary invasive catheterization. A valve stent placed in such patients has a high probability of proximal device dislodgement. Schievano, et al., "Variations in Right Ventricular Outflow Tract Morphology Following Repair of Congenital Heart Disease: Implications for Percutaneous Pulmonary Valve Implantation", Journal of Cardiovascular Magnetic Resonance 9(4) 2007, pgs. 687-95, which is incorporated herein by reference, proposes the classification of various morphologies of the pulmonary trunk into five groups: pyramidal shape (type I), constant diameter (type II), inverted pyramidal shape (type III), wide centrally but narrowed proximally and distally (type IV), and narrowed centrally but wide proximally and distally (type V). Patients having pulmonary trunk morphology of type I are considered to be unsuitable for PPVI due to a narrow artery and high probability of device migration. Thus, according to an embodiment of the present invention a model-based method for automatically determining whether a patient is suitable for PPVI discriminates anatomies of type I from other classes.

Figure 7:
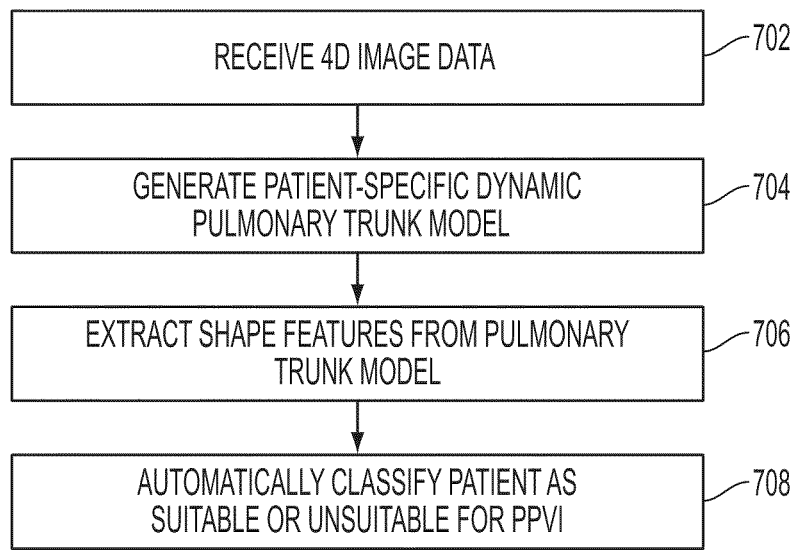
FIG. 7 illustrates a method for determining whether a patient is suitable for PPVI intervention according to an embodiment of the present invention.

FIG. 7 illustrates a method for determining whether a patient is suitable for PPVI intervention according to an embodiment of the present invention. As illustrated in FIG. 7, at step 702 4D patient specific image data, such as 4D cardiac CT data, is received. At step 704, a patient specific 4D pulmonary trunk model is generated from the 4D image data. The patient-specific dynamic pulmonary trunk model is generated in step 704, as described above in the method of FIG. 4.

At step 706, shape features are extracted from the patient-specific dynamic pulmonary trunk model. In particular, the parameters of the 4D pulmonary trunk model that is estimated for the patient-specific image data are extracted and used as features to classify the patient as suitable or unsuitable for PPVI. Furthermore, additional features can be extracted from the 4D pulmonary trunk model.

At step 708, the patient is automatically classified as suitable or unsuitable for PPVI based on the extracted features using a learned (i.e., trained) discriminative distance function. According to an advantageous implementation, the discriminative distance function can be learned using a Random Forest in the product space. A learned distance function measures the similarity of two particular shapes. A discriminative distance function can be learned via formulating a binary classification problem in the product space or via using the intrinsic random forest similarity. Accordingly, instead of learning (training) a classifier directly to classify a patient as suitable or unsuitable for PPVI, the learning process is divided into two sequential steps of distance learning followed by classification or clustering, where each step requires a search in a less complex functional space than direct learning of a classifier.

The labels for classification $y \in \{-1,+1\}$ correspond to the classifications of unsuitable patient data and suitable patient data for PPVI. To learn the distance function, each case in annotated training data is represented with a parameter vector C containing the N 3D points $P_i$ of the respective pulmonary trunk model and a set of M additional features $F_i$ derived from the model, such that:

$$\hat{y} = \operatorname*{argmax}_{y \in \{-1,+1\}} (p(y \mid C)) C \tag{3}$$

$$= ((P_1^x, P_1^y, P_1^z), \ldots, (P_N^x, P_N^y, P_N^z), F_1, \ldots, F_M).$$

Learning a distance function helps to combine the power of strong learners with the transparency of nearest neighbor classification.

According to an advantageous implementation, the discriminative distance function is learned using equivalence constraints. Learning from weak representations, such as equivalence constraints, provides high flexibility for learning arbitrary functions. Equivalence constraints are represented using triplets $(C^1, C^2, y)$, where $C^1$ and $C^2$ are coordinates in the original space and $y \in \{-1, +1\}$ is a label indicating whether the two points are similar (from the same class or cluster) or dissimilar. Learning from such triplets is referred to as learning in the product space (i.e., with pairs of points as inputs). Commonly, a binary distance function is output from learning from equivalence constraints, predicting only whether two outputs are similar to each other. This can be overcome by using the signed margin of margin-based classifiers as the required distance function. According to an embodiment of the present invention, a signed margin model constructed using a Random Forest (RF) can be used as the required distance function for distance learning from equivalence constraints.

For an RF learned for a certain classification problem, the proportion of trees where two instances appear together in the same leaves can be used as a measure of similarity between them. For a given forest f, the similarity between two instances $C^1$ and $C^2$ is calculated as follows. The instances are propagated down all K trees within f and their terminal positions z in each of the trees ($z_1 = (z_{11}, \ldots, z_{1K})$ for $C^1$, similarly $z_2$ for $C^2$) are recorded. The similarity between the two instances is then equal to:

$$S(C^1, C^2) = \frac{1}{K} \sum_{i=1}^{K} I(z_{1i} = z_{2i}) \quad (4)$$

where I is the indicator function. Accordingly, as described above, the discriminative distance function can be learned in the product space of equivalence constraints or can comprise the intrinsic random forest similarity of a Random Forest trained in the original space.

Figure 8A:
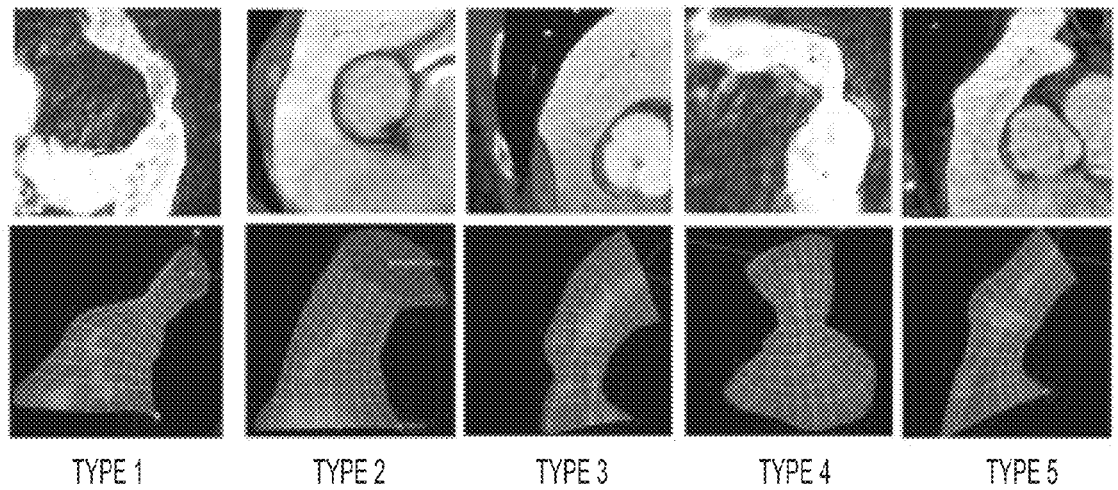
FIG. 8A illustrates examples of 3D models for each of the morphological pulmonary trunk types.
Figure 8B:
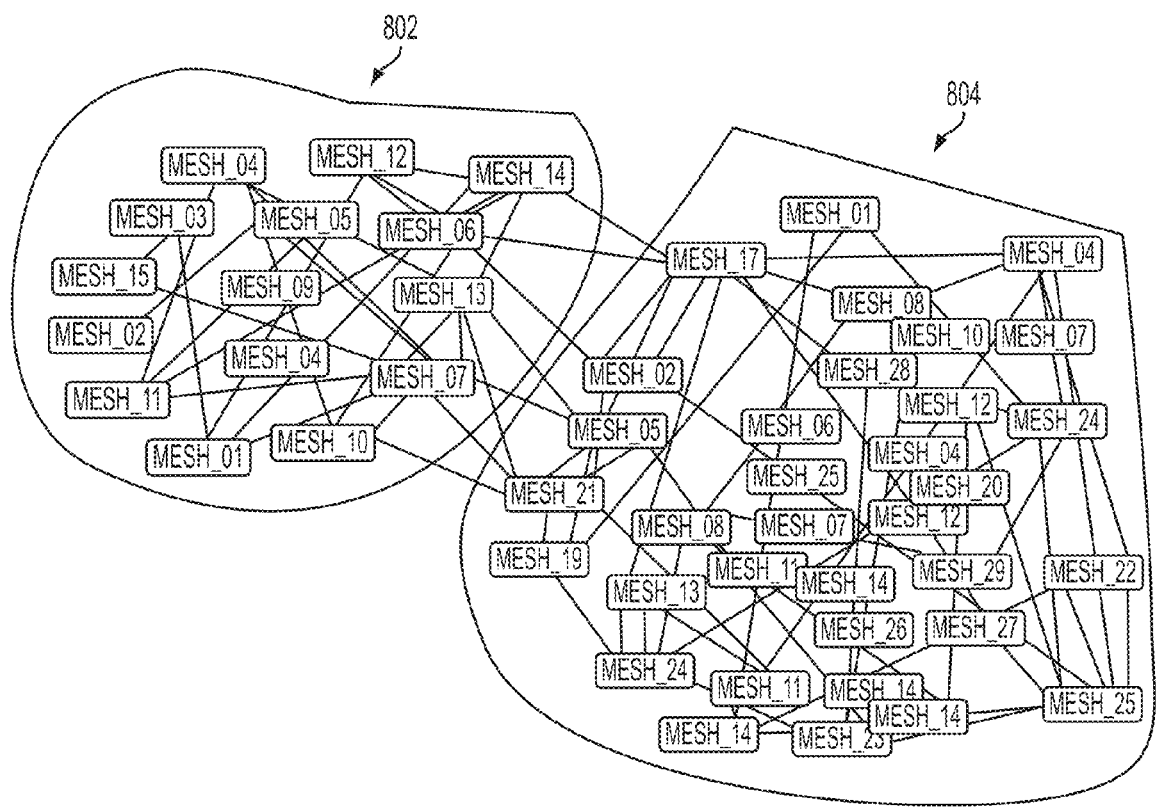
FIG. 8B illustrates clustering based classification of pulmonary trunk models.

A trained discriminative distance function uses the features extracted from the patient specific pulmonary trunk model to cluster the patient specific pulmonary trunk model with similar pulmonary trunk models in the training data. The pulmonary trunk is classified as suitable for PPVI if the patient specific model is clustered with training examples that are suitable for PPVI (i.e., types II, III, IV, and V) and is classified as unsuitable for PPVI if the patient specific model is clustered with training examples that are not suitable for PPVI (i.e., type I). FIG. 8A illustrates examples of 3D models for each of the morphological pulmonary trunk types. FIG. 8B illustrates clustering based classification of pulmonary trunk models. As illustrated in FIG. 8B, cluster 802 corresponds to pulmonary trunks that are unsuitable for PPVI and cluster 804 corresponds to pulmonary trunks that are suitable for PPVI.

Figure 9:
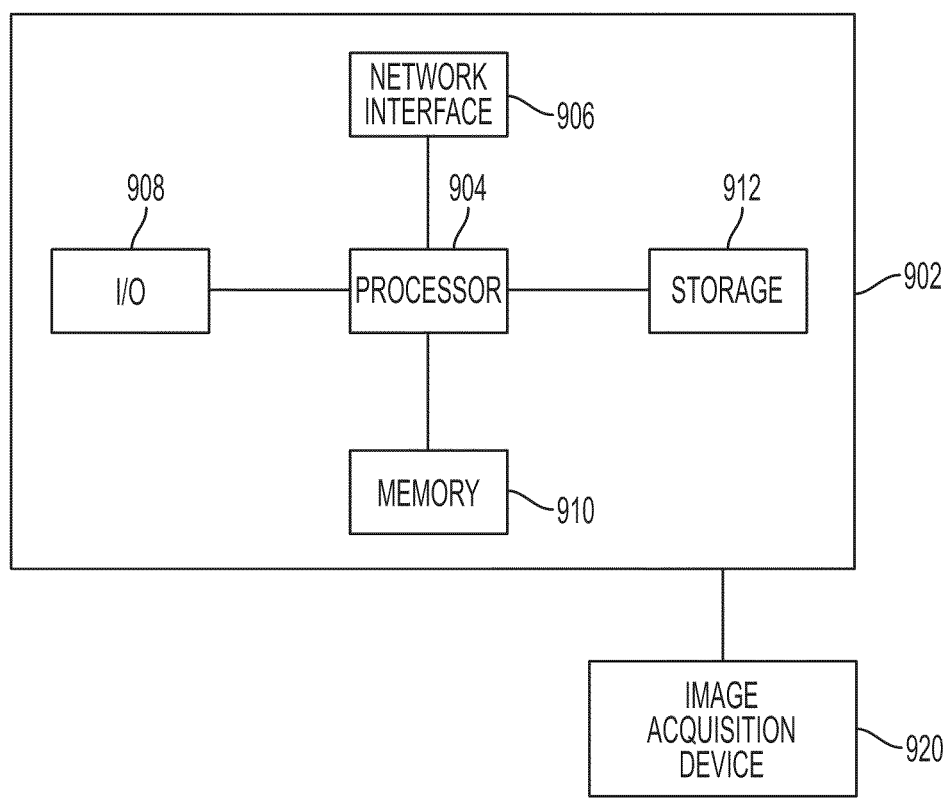
FIG. 9 is a high-level block diagram of a computer capable of implementing the present invention.

The above-described methods for modeling a pulmonary trunk and model-based classification for PPVI intervention planning may be implemented on a computer using well-known computer processors, memory units, storage devices, computer software, and other components. A high-level block diagram of such a computer is illustrated in FIG. 9. Computer 902 contains a processor 904, which controls the overall operation of the computer 902 by executing computer program instructions which define such operation. The computer program instructions may be stored in a storage device 912 (e.g., magnetic disk) and loaded into memory 910 when execution of the computer program instructions is desired. Thus, the stages of the framework of FIG. 2 and the steps of the method of FIGS. 4 and 7 may be defined by the computer program instructions stored in the memory 910 and/or storage 912 and controlled by the processor 904 executing the computer program instructions. An image acquisition device 920, such as a CT scanning device, can be connected to the computer 902 to input image data to the computer 902. It is possible to implement the image acquisition device 920 and the computer 902 as one device. It is also possible that the image acquisition device 920 and the computer 902 communicate wirelessly through a network. The computer 902 also includes one or more network interfaces 906 for communicating with other devices via a network. The computer 902 also includes other input/output devices 908 that enable user interaction with the computer 902 (e.g., display, keyboard, mouse, speakers, buttons, etc.). Such input/output devices 908 may be used in conjunction with a set of computer programs as an annotation tool to annotate volumes received from the image acquisition device 920. One skilled in the art will recognize that an implementation of an actual computer could contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for determining whether a patient is suitable for percutaneous pulmonary valve implantation (PPVI) intervention, comprising:
    receiving four dimensional (4D) cardiac image data of a patient comprising a plurality of frames, each frame comprising volumetric image data;
    generating, by a processor, a patient-specific dynamic pulmonary trunk model based on the 4D cardiac image data of the patient; and
    automatically classifying, by a processor, the patient as suitable or unsuitable for PPVI intervention based on the generated patient-specific dynamic pulmonary trunk model.

2. The method of claim 1, wherein said step of automatically classifying the patient as one of suitable for PPVI intervention based on the generated patient-specific dynamic pulmonary trunk model comprises:
    extracting shape features from the patient specific dynamic pulmonary trunk model; and
    classifying the patient as suitable or unsuitable for PPVI intervention based on the extracted shape features using a trained discriminative distance function.

3. The method of claim 2, wherein the trained discriminative distance function clusters the patient-specific dynamic pulmonary trunk model with similar pulmonary trunk models contained in a training data set, the clustering based on the extracted shape features, and said step of classifying the patient as suitable or unsuitable for PPVI intervention based on the extracted shape features using a trained discriminative distance function comprises:

if the patient-specific dynamic pulmonary trunk model is clustered with pulmonary trunk models that are suitable for PPVI intervention, classifying the patient as suitable for PPVI intervention; and if the patient-specific dynamic pulmonary trunk model is clustered with pulmonary trunk models that are unsuitable for PPVI intervention, classifying the patient as unsuitable for PPVI intervention.

4. The method of claim 2, wherein the trained discriminative distance function is trained using one of a Random Forest in product space and an intrinsic Random Forest similarity of a Random Forest trained in an original space.

5. The method of claim 1, wherein said step of generating a patient-specific dynamic pulmonary trunk model based on the 4D cardiac image data of the patient comprises:

detecting bounding boxes in the frames of the 4D cardiac image data;

detecting anatomic landmarks in the frames of the 4D cardiac image data based on the detected bounding boxes;

detecting ribs of a pulmonary artery in the frames of the 4D cardiac image data based on the detected anatomic landmarks; and generating the patient-specific dynamic pulmonary trunk model by fitting a physiological pulmonary trunk model to the frames of the 4D cardiac image data based on the detected ribs and anatomic landmarks.

6. The method of claim 1, wherein the 4D cardiac image data is a 4D computed tomography (CT) sequence.

7. The method of claim 5, wherein the 4D cardiac image data is a 4D computed tomography (CT) sequence, and:

said step of detecting bounding boxes comprises detecting bounding boxes in frames of the 4D CT sequence representing end-diastolic (ED) and end-systolic (ES) phases of a cardiac cycle and extending the detected bounding boxes to remaining frames of the 4D CT sequence;

said step of detecting anatomic landmarks comprises detecting anatomic landmarks in the frames of the 4D CT sequence representing the ED and ES phases and extending the detected anatomic landmarks to the remaining frames of the 4D CT sequence;

said step of detecting ribs comprises detecting ribs of the pulmonary artery in the frames of the 4D CT sequence representing the ED and ES phases and extending the detected ribs to the remaining frames of the 4D CT sequence; and said step of generating the patient-specific dynamic pulmonary trunk model by fitting a physiological pulmonary trunk model to the frames of the 4D cardiac image data based on the detected ribs and anatomic landmarks comprises fitting the physiological pulmonary trunk model to a frame of the 4D CT sequence representing one of the ED and ES phases and extending the physiological pulmonary trunk model to the remaining frames of the 4D CT sequence using one-step-forward prediction for smooth motion estimation.

8. The method of claim 5, wherein said step of detecting bounding boxes comprises:

detecting bounding boxes corresponding to a right ventricular outflow tract (RVOT) region, a main bifurcation region, a left bifurcation region, and a right bifurcation region in the frames of the 4D cardiac data.

9. The method of claim 8, wherein said step of detecting bounding boxes corresponding to a right ventricular outflow tract (RVOT) region, a main bifurcation region, a left bifurcation region, and a right bifurcation region in the frames of the 4D cardiac data comprises:

detecting the bounding boxes corresponding to the RVOT region, the main bifurcation region, the left bifurcation region, and the right bifurcation region using trained detectors for each bounding box, wherein the trained detectors are trained using marginal space learning (MSL), such that each of the trained detectors comprises marginal space classifiers trained using a probabilistic boosting tree (PBT) with at least one of 3D Haar features and steerable features.

10. The method of claim 8, wherein said step of detecting anatomic landmarks comprises:

detecting trigone and RVOT locations in the frames of the 4D cardiac data based on the detected bounding box corresponding to the RVOT region;

detecting a main-bifurcation location in the frames of the 4D cardiac data based on the detected bounding box corresponding to the main-bifurcation region;

detecting a left-bifurcation location in the frames of the 4D cardiac data based on the detected bounding box corresponding to the left-bifurcation region; and detecting a right-bifurcation location in the frames of the 4D cardiac data based on the detected bounding box corresponding to the right-bifurcation region.

11. The method of claim 10, wherein the trigone, RVOT, main-bifurcation, left-bifurcation, and right-bifurcation locations are detected using trained detectors for each anatomic landmark, wherein the trained detectors are trained using a probabilistic boosting tree (PBT).

12. The method of claim 10, wherein said step of detecting ribs of a pulmonary artery comprises:

detecting a main-rib based on the detected RVOT and main-bifurcation locations, a left-rib based on the detected main-bifurcation and left-bifurcation locations, and a right-rib based on the detected main-bifurcation and right bifurcation locations.

13. The method of claim 12, wherein said step of detecting a main-rib based on the detected RVOT and main-bifurcation locations, a left-rib based on the detected main-bifurcation and left-bifurcation locations, and a right-rib based on the detected main-bifurcation and right bifurcation locations comprises:

detecting the main-rib, left-rib, and right rib with trained circle detectors for each rib.

14. The method of claim 5, wherein said step of generating the patient-specific dynamic pulmonary trunk model by fitting a physiological pulmonary trunk model to the frames of the 4D cardiac image data based on the detected ribs and anatomic landmarks comprises:

generating an initial estimate of the patient-specific dynamic pulmonary trunk model in the frames of the 4D cardiac image data by fitting the physiological pulmonary trunk model based on the detected ribs and anatomic features; and detecting a pulmonary trunk boundary in the frames of the 4D image data to refine a boundary of the initial estimate of the patient-specific pulmonary trunk model.

13

15. The method of claim 14, wherein said step of detecting a pulmonary trunk boundary in the frames of the 4D image data comprises:
   detecting the pulmonary trunk boundary using a trained boundary detector, wherein the trained boundary detector is trained using PBT with steerable features.

16. An apparatus for determining whether a patient is suitable for percutaneous pulmonary valve implantation (PPVI) intervention, comprising:
   means for receiving four dimensional (4D) cardiac image data of a patient comprising a plurality of frames, each frame comprising volumetric image data;
   means for generating a patient-specific dynamic pulmonary trunk model based on the 4D cardiac image data of the patient; and
   means for automatically classifying the patient as suitable or unsuitable for PPVI intervention based on the generated patient-specific dynamic pulmonary trunk model.

17. The apparatus of claim 16, wherein said means for automatically classifying the patient as one of suitable for PPVI intervention based on the generated patient-specific dynamic pulmonary trunk model comprises:
   means for extracting shape features from the patient specific dynamic pulmonary trunk model; and
   means for classifying the patient as suitable or unsuitable for PPVI intervention based on the extracted shape features using a trained discriminative distance function.

18. The apparatus of claim 17, wherein the trained discriminative distance function clusters the patient-specific dynamic pulmonary trunk model with similar pulmonary trunk models contained in a training data set, the clustering based on the extracted shape features, and said means for classifying the patient as suitable or unsuitable for PPVI intervention based on the extracted shape features using a trained discriminative distance function comprises:
   means for classifying the patient as suitable for PPVI intervention if the patient-specific dynamic pulmonary trunk model is clustered with pulmonary trunk models that are suitable for PPVI intervention; and
   means for classifying the patient as unsuitable for PPVI intervention if the patient-specific dynamic pulmonary trunk model is clustered with pulmonary trunk models that are unsuitable for PPVI intervention.

19. The apparatus of claim 17, wherein the trained discriminative distance function is trained using one of a Random Forest in product space and an intrinsic Random Forest similarity of a Random Forest trained in an original space.

20. The apparatus of claim 16, wherein said means for generating a patient-specific dynamic pulmonary trunk model based on the 4D cardiac image data of the patient comprises:
   means for detecting bounding boxes in the frames of the 4D cardiac image data;
   means for detecting anatomic landmarks in the frames of the 4D cardiac image data based on the detected bounding boxes;
   means for detecting ribs of a pulmonary artery in the frames of the 4D cardiac image data based on the detected anatomic landmarks; and
   means for generating the patient-specific dynamic pulmonary trunk model by fitting a physiological pulmonary trunk model to the frames of the 4D cardiac image data based on the detected ribs and anatomic landmarks.

21. A non-transitory computer readable medium encoded with computer executable instructions for determining whether a patient is suitable for percutaneous pulmonary valve implantation (PPVI) intervention, the computer executable instructions defining steps comprising:
   receiving four dimensional (4D) cardiac image data of a patient comprising a plurality of frames, each frame comprising volumetric image data;
   generating a patient-specific dynamic pulmonary trunk model based on the 4D cardiac image data of the patient; and
   automatically classifying the patient as suitable or unsuitable for PPVI intervention based on the generated patient-specific dynamic pulmonary trunk model.

22. The computer readable medium of claim 21, wherein the computer executable instructions defining the step of automatically classifying the patient as one of suitable for PPVI intervention based on the generated patient-specific dynamic pulmonary trunk model comprise computer executable instructions defining the steps of:
   extracting shape features from the patient specific dynamic pulmonary trunk model; and
   classifying the patient as suitable or unsuitable for PPVI intervention based on the extracted shape features using a trained discriminative distance function.

23. The computer readable medium of claim 22, wherein the trained discriminative distance function clusters the patient-specific dynamic pulmonary trunk model with similar pulmonary trunk models contained in a training data set, the clustering based on the extracted shape features, and the computer executable instructions defining the step of classifying the patient as suitable or unsuitable for PPVI intervention based on the extracted shape features using a trained discriminative distance function comprise computer executable instructions defining the steps of:
   if the patient-specific dynamic pulmonary trunk model is clustered with pulmonary trunk models that are suitable for PPVI intervention, classifying the patient as suitable for PPVI intervention; and
   if the patient-specific dynamic pulmonary trunk model is clustered with pulmonary trunk models that are unsuitable for PPVI intervention, classifying the patient as unsuitable for PPVI intervention.

24. The computer readable medium of claim 22, wherein the trained discriminative distance function is trained using one of a Random Forest in product space and an intrinsic Random Forest similarity of a Random Forest trained in an original space.

25. The computer readable medium of claim 21, wherein the computer executable instructions defining the step of generating a patient-specific dynamic pulmonary trunk model based on the 4D cardiac image data of the patient comprise computer executable instructions defining the steps of:
   detecting bounding boxes in the frames of the 4D cardiac image data;
   detecting anatomic landmarks in the frames of the 4D cardiac image data based on the detected bounding boxes;
   detecting ribs of a pulmonary artery in the frames of the 4D cardiac image data based on the detected anatomic landmarks; and
   generating the patient-specific dynamic pulmonary trunk model by fitting a physiological pulmonary trunk model to the frames of the 4D cardiac image data based on the detected ribs and anatomic landmarks.

* * * * *